United States Patent [19]

Lee et al.

[11] Patent Number: 5,355,415

[45] Date of Patent: Oct. 11, 1994

[54] PARALLEL DISTRIBUTED SAMPLE SCRAMBLING SYSTEM

[75] Inventors: Byeong G. Lee, Hanshin Green Apt. A-703, 65-8 Jamwondong, Seochoku, Seoul; Seok C. Kim, 302 382-32 Habjeongdong, Mapoku, Seoul, both of Rep. of Korea

[73] Assignees: Byeong Gi Lee; Seok Chang Kim; Goldstar Information & Communications, Ltd., all of Seoul, Rep. of Korea

[21] Appl. No.: 31,670

[22] Filed: Mar. 15, 1993

[51] Int. Cl.$^5$ ............................................... H04L 9/24
[52] U.S. Cl. ........................................ 380/47; 380/43; 380/50
[58] Field of Search ............................. 380/47, 43, 50

[56] References Cited

U.S. PATENT DOCUMENTS 4,531,022 7/1985 Pioli .................................. 380/50
4,755,987 7/1988 Lee et al. ......................... 380/50

OTHER PUBLICATIONS

Report: Parallel Scrambling Techniques for Digital Multiplexlers, AT&T Technical Journal, Author Doo-Whan Choi, 123-136.

"Self Synchronising Scrambler $x^{43}+1$" CCITT SG SVIII-Melbourne, 2-13, Dec. 1991.

Primary Examiner—Gilberto Barrón, Jr.
Attorney, Agent, or Firm—Darby & Darby

[57] ABSTRACT

A parallel distributed sample scrambling and descrambling system for fixed-sized packet transmission comprising a parallel scrambler and a parallel descrambler. The scrambler includes; a parallel shift register generator 61 for generating parallel sequences; a sampling means 62 for generating samples from said parallel shift register generator 61; a parallel scrambling means 63 for performing parallel scrambling function by modulo-2 adding the parallel sequences to parallel input data sequences; and a multiplexing means 64. The descrambler includes; a demultiplexing means 70; a parallel shift register generator 66 for generating parallel sequences; a sampling means 67 for generating samples from said parallel shift register generator 66; a comparing means 68 for comparing the samples transmitted from the scrambler with the samples generated by said sampling means 67; a correction means 65 for performing correction for samples at each correction time according to the comparison result from said comparing means; and a parallel descrambling means 69 for performing parallel descrambling of the scrambled data sequences by modulo-2 adding the parallel sequences to the scrambled data sequences.

8 Claims, 11 Drawing Sheets parallel scrambling

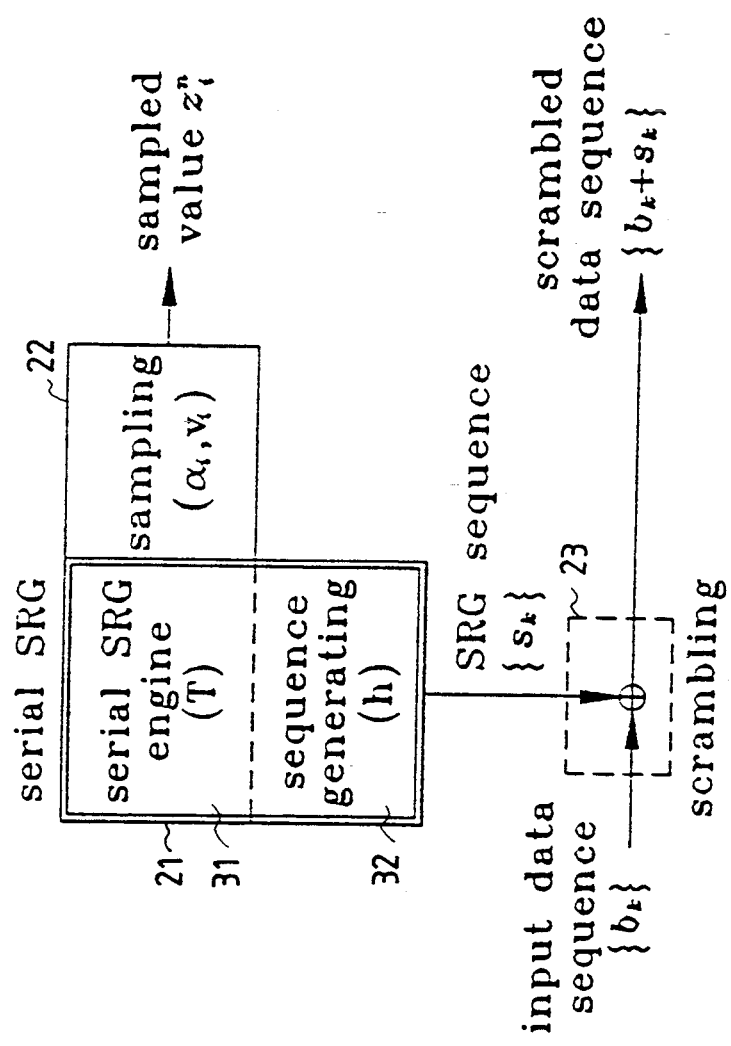

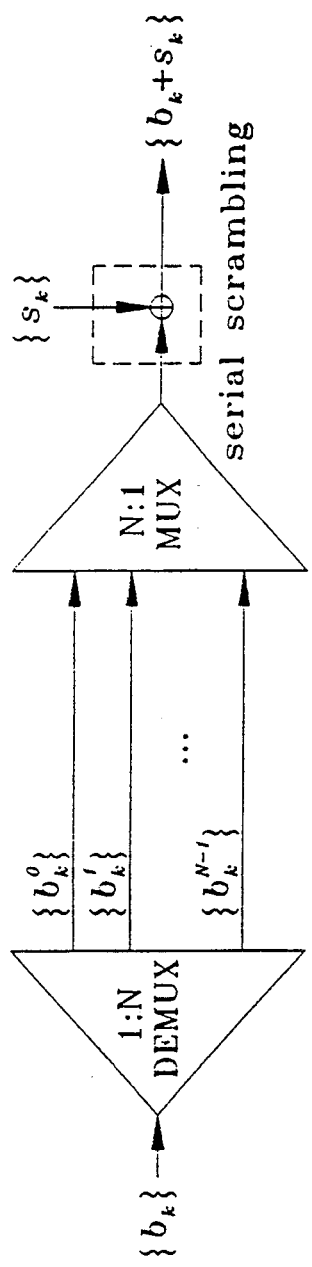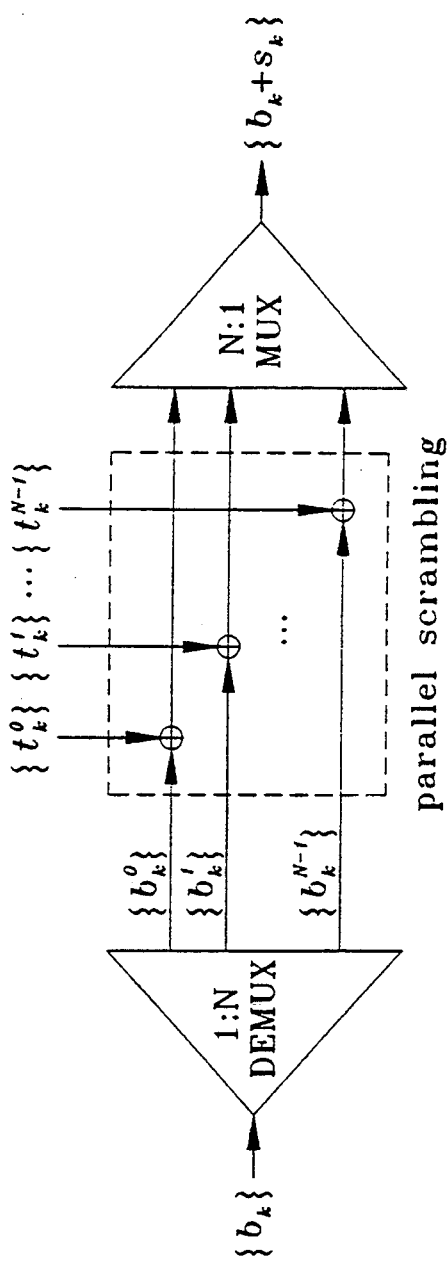

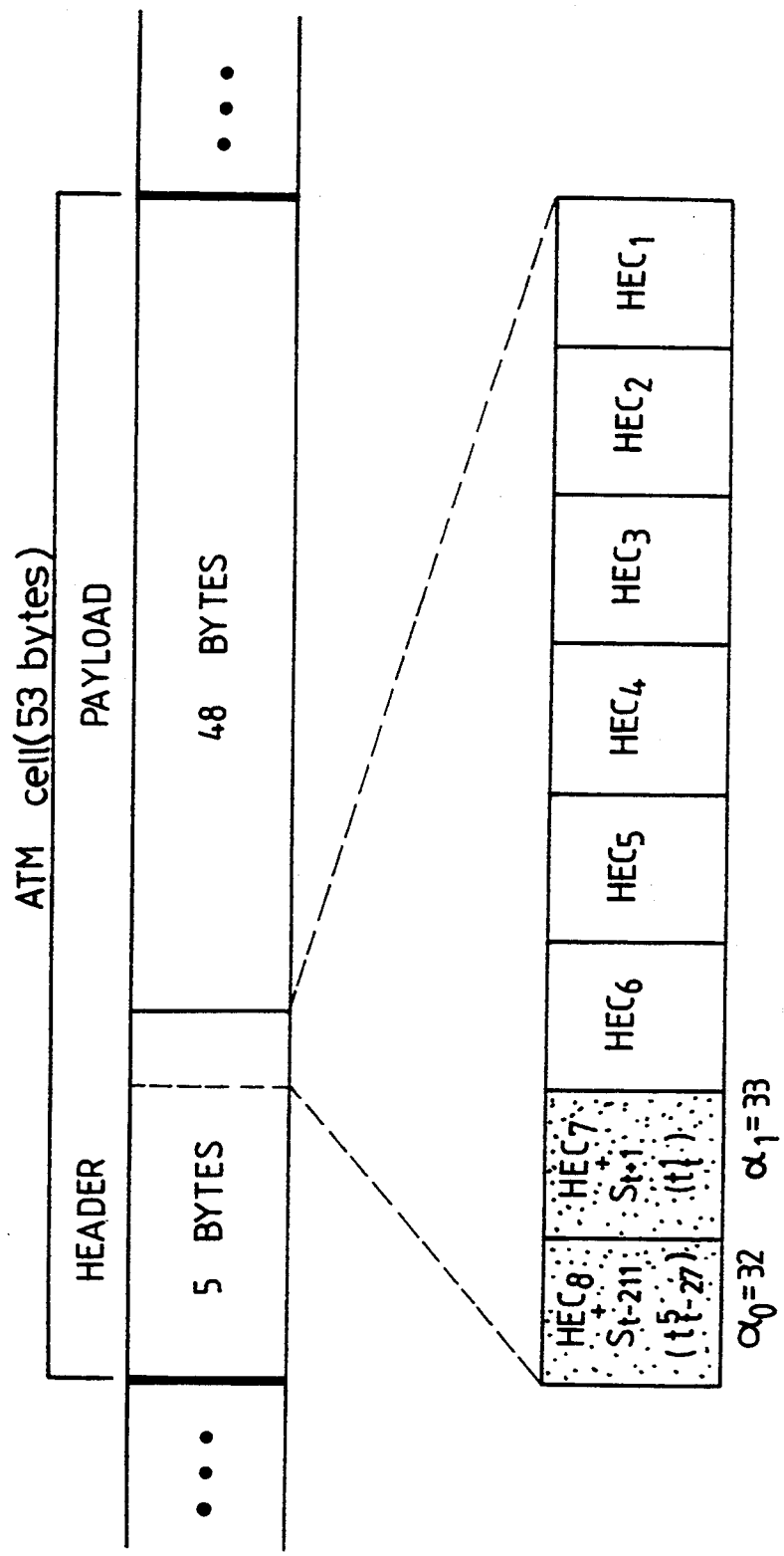

PARALLEL DISTRIBUTED SAMPLE SCRAMBLING SYSTEM

BACKGROUND OF THE INVENTION

The present invention relates to a parallel distributed sample scrambling and descrambling system.

A distributed sample scrambling (DSS) system suitable for scrambling the binary data consisting of fixed-sized packet stream scrambles and descrambles the binary data in the same way as that used in a Frame Synchronous Scrambling (FSS) system.

However, to achieve the effective scrambling in the DSS system, a method of synchronizing the state of the scrambler to the state of the descrambler is preferably different from that used in FSS system.

The synchronization in the DSS system is achieved by taking a sample representing the state of the scrambler, transmitting it to the descrambler over allocated time slots in every packet, comparing it to a sample generated from descrambler, and then if two samples are different from each other, correcting the state of descrambler so that the state of descrambler is identical to the state of scrambler.

According to recommendation by CC ITT, such DSS system is used for scrambling ATM (Asynchronous Transfer Mode) cell stream in the cell-based physical layer in BISDN (Broadband Integrated Services Digital Network).

The transmission rates in DSS system are multiple of 155.520 Mbps in the BISDN and the rates of 155,520 Mbps, 622.080 Mbps or 2488.320 Mbps are of special interests.

The scrambling and descrambling rates in the DSS system are identical to the corresponding transmission rates, i.e. 155.520 Mbps, 622.080 Mbps or 2488.320 Mbps. In achieving the scrambling at such high processing rates, it is disadvantageous that high speed elements are required, the production cost is increased and the power consumption is increased. Furthermore, in the case of high speed transmission of Gbps grade, the scrambling at transmission rates may be impossible.

Therefore, it is an object of the invention to provide a parallel distributed sample scrambling system for fixed-sized packet transmission which can scramble the binary data at lower rates than the transmission rates.

It is other object of the invention to provide a parallel distributed sample descrambling system for fixed-sized packet transmission which can descramble the binary data at lower rates than transmission rates.

To achieve these objects, the parallel distributed scrambling system according to the invention comprises: a parallel shift register generator for generating parallel sequences for parallel scrambling, said generator including a plurality of shift registers and a plurality of modulo-2 adders, a sampling means for generating samples from said parallel shift register generator depending on transmission channel slots available for sample conveyance, a parallel scrambling means for performing parallel scrambling function by modulo-2 adding the parallel sequences from said parallel shift register generator to parallel input data sequences, and a multiplexing means for multiplexing the scrambled data sequences from said parallel scrambling means. Also, a parallel distributed sample descrambling system for fixed-sized packet transmission according to the invention comprises: a demultiplexing means for demultiplexing the multiplexed scrambled data sequences, a parallel shift register generator for generating parallel sequences for parallel descrambling, said generator including a plurality of shift registers and a plurality of modulo-2 adders, a sampling means for generating samples from said parallel shift register generator depending on transmission channel slots available sample conveyance, a comparing means, connected to the sampling means, for comparing the samples transmitted from the scrambler with the samples generated by said sampling means, a correction means, connected to the comparing means, for performing correction for samples at each correction time according to the comparison result for said comparing means, and a parallel descrambling means for performing parallel descrambling of the scrambled data sequences by modulo-2 adding the parallel sequences from said parallel shift register generator to the scrambled data sequences from said demultiplexing means.

BRIEF DESCRIPTION OF DRAWINGS

The above objects, features and other advantages of the invention will be more clearly understood from the following description taken in conjunction with accompanying drawings in which:

FIG. 2A is a functional block diagram of a scrambler of a DSS system;

FIG. 3 shows an example of conversion of serial scrambling to parallel scrambling, in which FIG. 3A shows a serial scrambling part and FIG. 3B shows a parallel descrambling part;

FIG. 7 shows a data structure for ATM cell transmission,

DETAILED DESCRIPTION OF THE INVENTION

Figure 1:
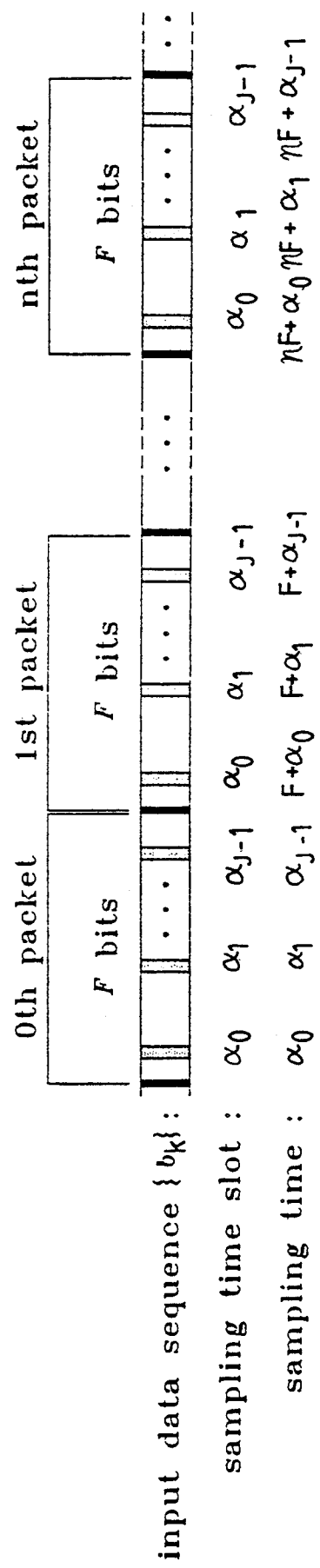
FIG. 1 shows a format of serial input data sequence.

Now referring to FIG. 1 shows a format of a serial input data sequence, the serial input data sequence $\{b_k\}$ to be scrambled consists of a stream of packets each of which has a length of F bits. The samples taken from the scrambler are transmitted over J sampling time slots $a_0, a_1, \ldots, a_{J-1}$ (dotted time slot in FIG. 1) located in every packet.

Figure 2B:
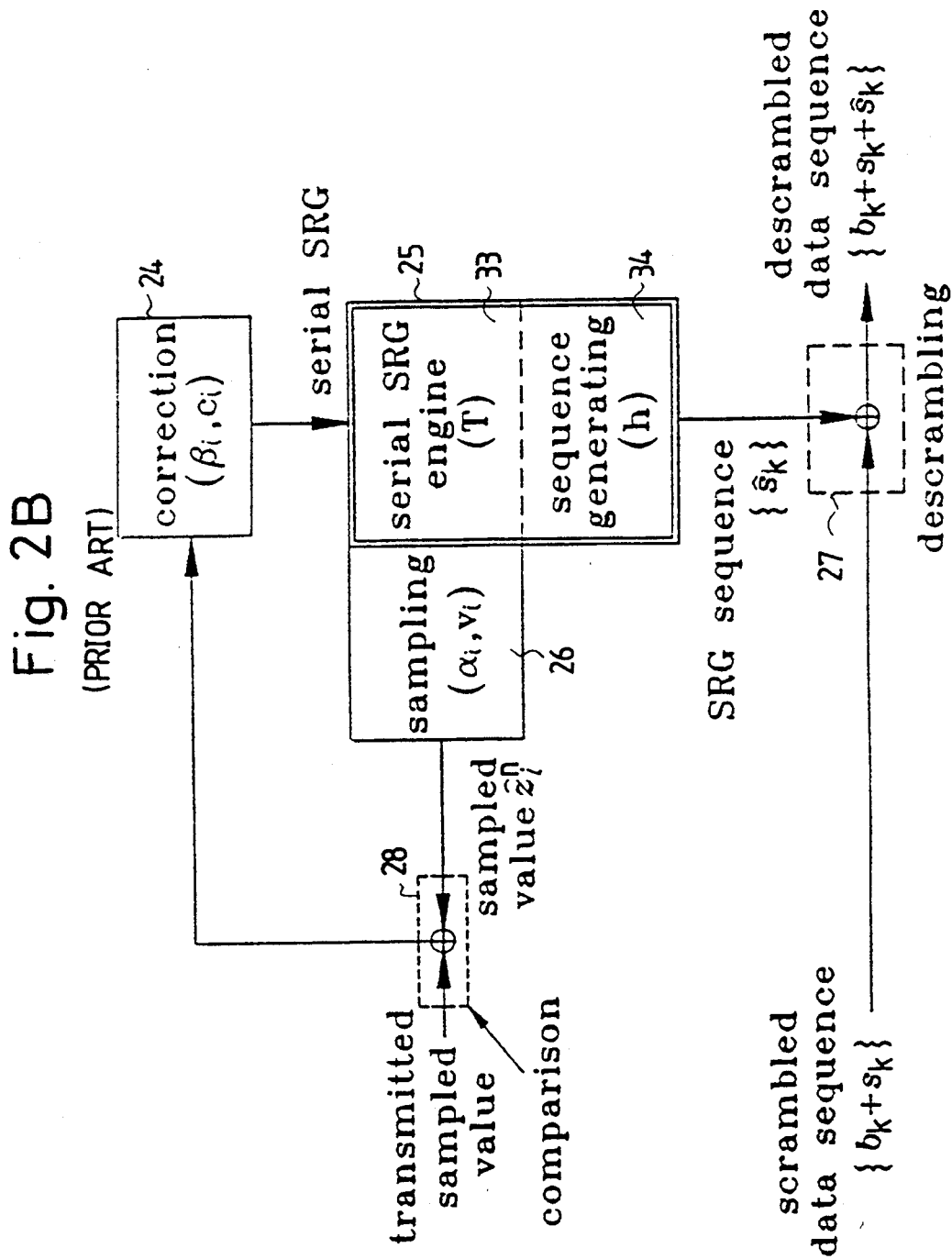
FIG. 2B is a functional block diagram of a descrambler of a DSS system.

Referring to FIG. 2 showing a serial DSS system, a scrambler shown in FIG. 2A comprises a serial shift register generator(SRG) 21, a sampling circuit 22 and a scrambling circuit 23. The serial SRG 21 includes a serial SRG engine 31 and a serial sequence generating circuit 32. A descrambler shown in FIG. 2B includes a serial shift register generator 25, a sampling circuit 26, a comparing circuit 28, a correction circuit 24 and a descrambling circuit 27. This serial SRG 25 also includes a serial SRG engine 33 and a serial sequence generating circuit 34. The comparing circuit 28 compares samples taken from the descrambler with samples taken from the scrambler. The correction circuit 24 performs the correction of SRG state of the serial SRG 25 in the descrambler in accordance with the comparison result from the comparing circuit 28.

For the SRG engine 31, we denote by the length L of the serial SRG 21, the number of shift registers within the SRG 21 in the scrambler, denote by state vector $d_k(\hat{d}_k$ in case the SRG belongs to the descrambler), the L-vector indicating states of shift registers in the SRG 21, and denote by state transition matrix T, the L×L matrix representing the relation between two state vectors $d_k$ and $d_{k-1}$ (or $\hat{d}_k$ and $\hat{d}_{k-1}$ in the descrambler). Then, the state transition matrix T of the SRG engine 31 renders the relation $$d_k = T \cdot d_{k-1} \ (or \ \hat{d}_k = T \cdot \hat{d}_{k-1}). \quad (1)$$

Then the feature of the SRG engine is uniquely determined by the state transition matrix T.

For the sequence generating circuit 32 (or 34) which generates the serial SRG sequence $\{s_k\}$ (or $\hat{s}_k$ in the descrambler) in the scrambler to be added (Here-inafter, all additions and multiplications are modulo-2 operations except for those in subscripts or superscripts) to the input data sequence $\{b_k\}$ for scrambling, we denote by generating vector h, L-vector representing the relation between the sequence $\{s_k\}$ (or $\hat{s}_k$) and the state vector $d_k$(or $\hat{d}_k$). Then, the generating vector h of the sequence generating circuit yields the relation $$s_k = h^t \cdot d_k (or \ \hat{s}_k = h^t \cdot \hat{d}_k). \quad (2)$$

Then the feature of the serial sequence-generating circuit is uniquely determined by the generating vector h.

For the sampling circuit which generates samples representing states of shift registers in the SRG engine 31, we denote by $Z_i^n$ or $\hat{Z}_i^n$ in the case of descrambler SRG), the sample to be transmitted to the ith sampling time slot $\alpha_i$, i=0, 1, ..., J−1, in the nth packet in FIG. 1, and denote by sampling vector $v_i$, i=0, 1, ..., J−1, L-vector representing the relation between the sample $z_i^n$ (or $\hat{z}_i^n$) and the state vector $d_{nF+\alpha_n}$ (or $\hat{d}_{nF+\alpha_i}$) generated at sampling time $nF+\alpha_i$. Then the sample $z_i^n$ can be expressed by the following equation.

$$z_i^n = v_i^t \cdot d_{nF+\alpha_i} \ (or \ \hat{z}_i^n = v_i^t \cdot \hat{d}_{nF+\alpha_i}), \ i=0,1,\ldots, J-1. \quad (3)$$

Then the feature of the sampling circuit is uniquely determined by the sampling time slots and the sampling vectors.

The scrambling circuit 23 in the scrambler scrambles the input data sequence $\{b_k\}$ by adding the SRG sequence $\{s_k\}$ from the serial SRG 21 to the input data sequence $\{b_k\}$. The descrambling circuit 27 in the descrambler descrambles the scrambled data sequence $\{b_k+s_k\}$ by adding the serial SRG sequence $\{\hat{s}_k\}$ from the serial SRG 25 to the scrambled data sequence $\{b_k+s_k\}$. Accordingly, to make the descrambled date sequence $\{b_k+s_k+\hat{s}_k\}$ identical to the input data sequence $\{b_k\}$, the SRG sequence $\{\hat{s}_k\}$ from the descrambler SRG 25 should be identical to the SRG sequence $\{s_k\}$ from the scrambler SRG 21. This means that the state of shift registers in the scrambler SRG engine 31 should be identical to the state of shift registers in the descrambler SRG engine 33. When performing the scrambling and/or descrambling, the time slots indicating packet boundary such as FAW (frame alignment word) and HEC (header error control) slots are not considered.

The comparing circuit 28 in the descrambler compares the sample $\hat{z}_i^n$ taken from the scrambler with the sample $z_i$ taken from the descrambler. Then, if the two samples are identical, the comparing circuit outputs O to the correction circuit 24 and if not, the comparing circuit 28 outputs 1 to the correction circuit 24. If the two samples $z_i^n$ and $\hat{z}_i^n$ are not identical, the correction circuit 24 in the descrambler corrects the state of shift registers in the descrambler SRG 25 so that it is identical to the state of shift registers in the scrambler SRG 21.

For the correction circuit 24, we denote by correction time slot $\beta_i$, i=0, 1, ..., J−1, the position of the time slot in which if the ith samples $z_i^n$ and $\hat{z}_i^n$ are not identical, the state of shift registers in the descrambler SRG is corrected, and denote by correction vector $c_i$, i=0, 1, ..., J−1, the L-vector representing the position of the shift register to be corrected.

Then, the feature of the correction circuit 24 is uniquely determined by the correction time slot $\beta_i$, i=0, 1, ..., J−1, and the correction vector $c_i$, i=0, 1, ..., J−1.

In the case that the samples $z_i^n$ and $\hat{z}_i^n$ are not identical, the state of shift registers in the serial SRG engine of the descrambler is corrected depending on the correction vector $c_i$ at the correction time $nF+\beta_i$. Accordingly, the relation (1) can be modified as follows.

$$\hat{d}_{nF+\beta_i} = T \cdot \hat{d}_{nF+\beta_i-1} + (z_i^n + \hat{z}_i^n)c_i, \ i=0, 1, \ldots, J-1. \quad (4)$$

Figure 4:
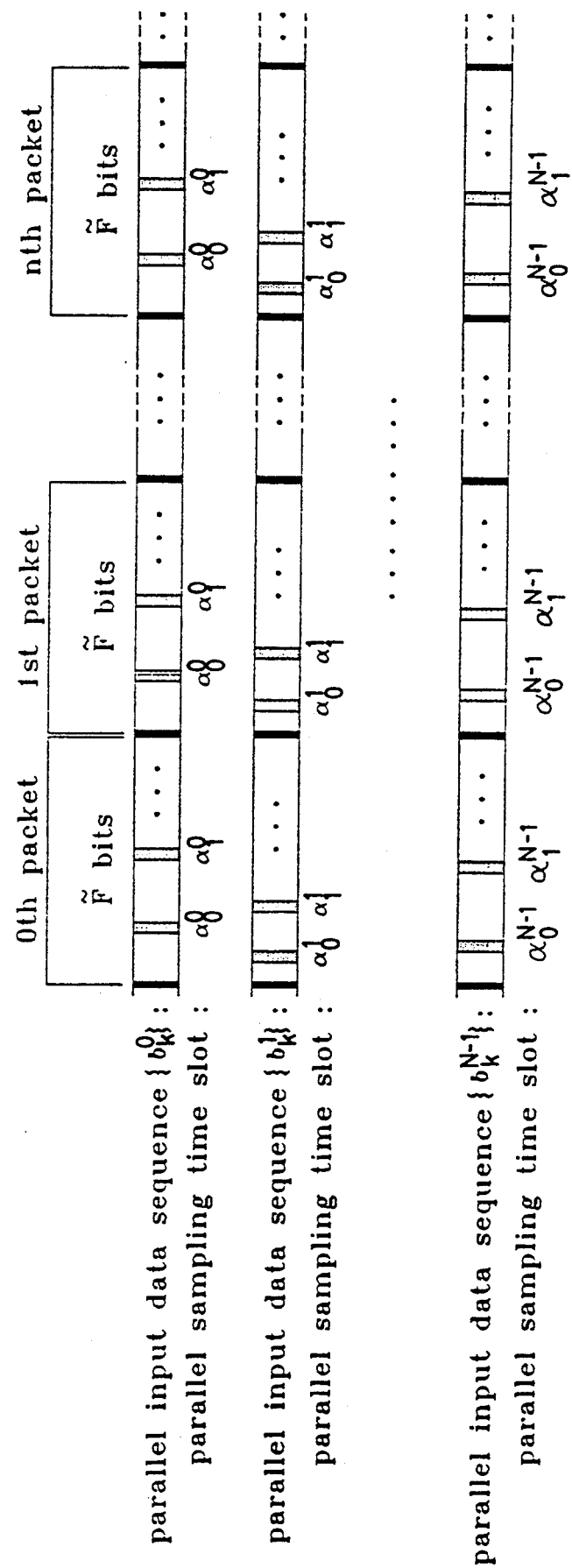
FIG. 4 shows a format of parallel input data sequences.

Now referring to FIG. 3 showing an example of the conversion of serial scrambling to parallel scrambling, FIG. 3A shows a serial scrambling process and FIG. 3B shows a parallel scrambling process. To implement parallel distributed scrambling system (PDSS system), firstly, the input data sequence $\{b_k\}$ should be multiplexed to N lower-rate parallel sequences $\{b_k^j\}$, j=0, 1, ..., N−1. Then, the scrambling part in FIG. 2A can be redrawn as FIG. 3A. If we move the serial scrambling process over the N:1 multiplexer, we obtain its equivalent parallel scrambling process shown in FIG. 3B. A similar set of diagrams can be drawn for the descrambling process. The resulting parallel scrambling and descrambling processes are then performed at 1/N times the original serial scrambling and descrambling rate (equal to the original transmission rate), where N can be chosen to be any number among factors of the packet length F. Then, we can obtain the parallel input data sequences $\{b_k^j\}$ j=0, 1, ..., N−1, shown in FIG. 4 from the input data sequence $\{b_k\}$ shown in FIG. 1. In FIG. 4, $\bar{F}$ equals to F/N and dotted time slots are parallel sampling time slots corresponding to the sampling time slots $\alpha_i$, 0, 1, ..., J−1 in the serial input data sequence $\{b_k\}$. We denote by $q_i$ and $r_i$, the quotient and the remainder of the serial sampling time slots $\alpha_i$, i=0, 1, ..., J−1 divided by N. Then, these time slots correspond to the $q_i$th parallel time slots in the $r_i$th parallel data sequence $\{b_k^n\}$. Therefore, the value $N\alpha_i^j+1$ for the parallel sampling time slots $j$ corresponds to the value of one of the serial sampling time slots $\alpha_i$, i=0, 1, ..., J−1.

Next, the serial SRG in the descrambler should be changed to the parallel SRG (PSRG) which can generate N parallel sequences $\{t_k{}^j\}$ (or $\{\hat{t}_k{}^j\}$ in the descrambler) that make the parallel-scrambled and multiplexed signal identical to the serial scrambled and descrambled signal.

In mathematical expression, it is equivalent to changing the state transition matrix T from the serial SRG engine in expression (1) and the generating vector h from the serial-sequence generating circuit in expression (2) respectively to the PSRG state transition matrix Tp and the parallel generating vector $h_j$, $j=0, 1, \ldots, N-1$, thus yielding the modified expressions $$d_k = T_p \cdot d_{k-1} \ (\text{or } \hat{d}_k = T_p \cdot \hat{d}_{k-1}), \quad (5)$$

$$t_k = h_j \cdot d_k \ (\text{or } \hat{t}_k{}^j = h^j \cdot \hat{d}_k). \quad (6)$$

Figure 5:
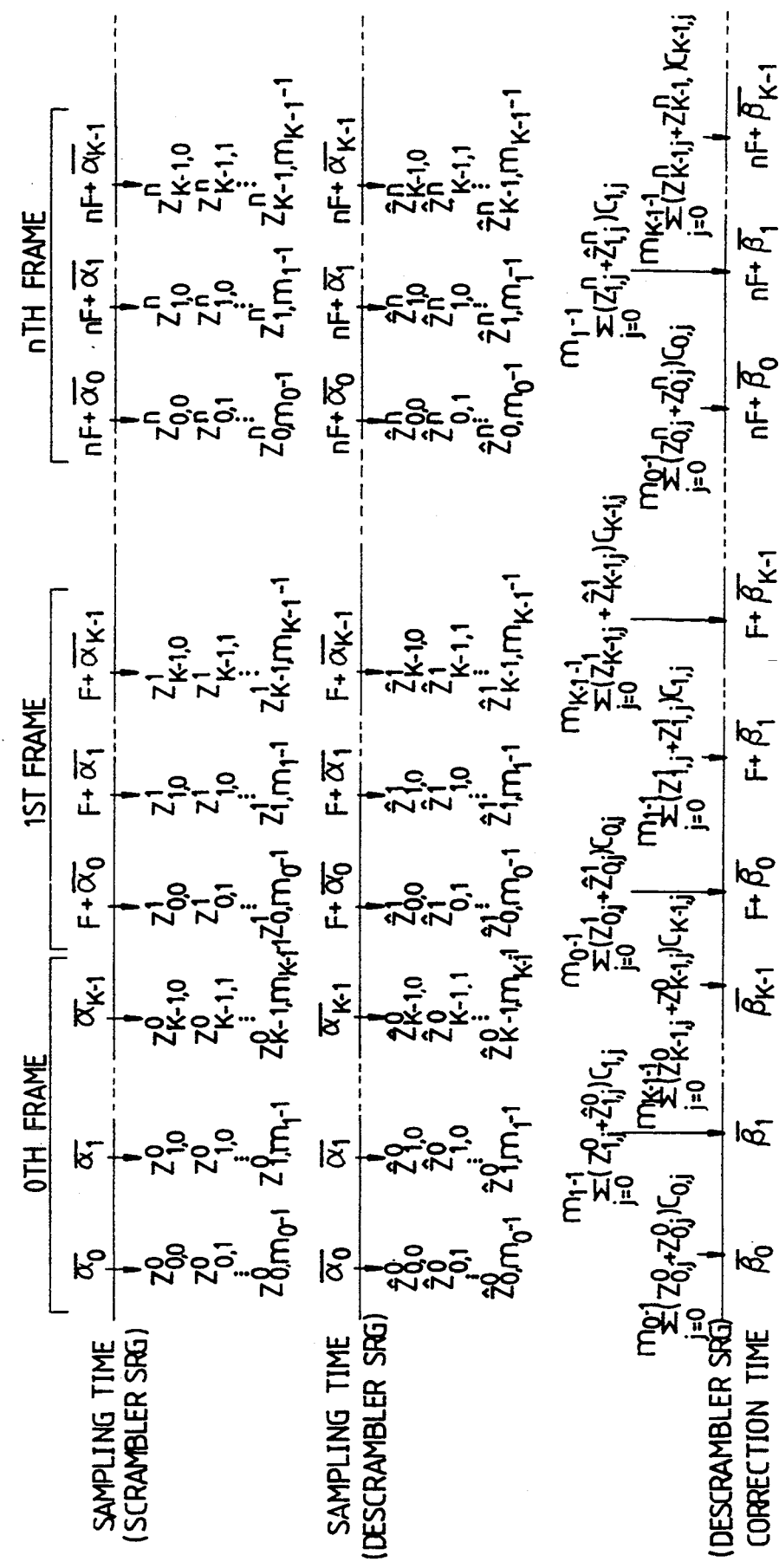
FIG. 5 is a timing diagram for sampling and correction times of parallel DSS system.

Another important change to be made is in sampling circuit. The sampling process depends on the parallel sampling time slots $\alpha_k{}^j$ in the parallel data input sequences $\{b_k{}^j\}$, $j=0, 1, \ldots, N-1$ shown in FIG. 4. In parallel sampling process, plural samples may be taken at a time. Accordingly, the parallel sampling time slots in FIG. 4 may be redrawn as FIG. 5 depending on the sampling time and the number of samples taken in the sampling time. FIG. 5 is a timing diagram for sampling and correction times of PDSS. In FIG. 5, $\bar{\alpha}_i$, $i=0, 1, \ldots, K-1$, denotes the parallel sampling time slots and these time slots are arranged according to size except for the repeated time slots among the parallel time slots $\alpha_j{}^j$ shown in FIG. 4. Also, m denotes the number of samples taken to the parallel sampling time slots $\bar{\alpha}_i i=0, 1, \ldots, K-1$, and $z_{i,l}{}^n$ (or $\hat{z}_{i,l}{}^n$ in the descrambler) $J=0, 1, \ldots, m_i-1$ denotes m samples taken to the parallel sampling time slots $\bar{\alpha}_i$ in the nth packet. It is noted that $\bar{\alpha}_i$ and $m_i$ are obtained according to the data format shown in FIG. 4 and the samples $z_{i,l}{}^n$ (or $\hat{z}_{i,l}{}^n$) should be identical to the samples taken in the corresponding sampling time slots in the serial data sequence. Also, we denote by $v_{i,l}$, $i=0, 1, \ldots, K-1$, $l=0, 1, \ldots, m_i-1$, the sampling vector taking the sampled value $z_{i,l}{}^n$. Then the equation (3) can be modified as follows.

$$z_{i,l}{}^n = v_{i,l} \cdot d_{nF+\bar{\alpha}i} \ (\text{or } \hat{z}_{i,l}{}^n = v_{i,l} \cdot \hat{d}_{nF+\bar{\alpha}l}) \ i=0, 1, \ldots, K-1, \ l=0, 1, \ldots, m_i-1. \quad (7)$$

The comparing process depends on the sampling process. Accordingly, the comparing circuit should be changed so that can compare the $m_i$ samples taken in the parallel sampling process concurrently.

Finally, the correction process in the descrambler should be modified according of the sampling process. Since in the parallel sampling process, $m_i$ samples $z_{i,l}{}^n$ (or, $\hat{z}_{i,l}{}^n$), $l=0, 1, \ldots, m-1$ are taken at the parallel sampling time slots $\bar{\alpha}_i$, corrections for $m_i$ samples should be preformed at the same time slot $\beta_i$, which we call the correction time slot (see FIG. 5). We denote by $C_{i,l}$, $i=0, 1, \ldots, K-1$, $l=0, 1, \ldots, m_i-1$, the correction vector representing correction positions of the shift registers in the descrambler PSRG in the case that the samples $z_{i,l}{}^n$ and $\hat{z}_{i,l}{}^n$ are not identical. Then the equation (4) can be modified as follows $$\hat{d}_{nF+\bar{\beta}i} = \quad (8)$$

$$T_p \cdot \hat{d}_{nF+\bar{\beta}i-1} + \sum_{l=0}^{m_i} (z_{i,l}^n + \hat{z}_{i,l}^n) c_{i,l}, \ i = 0, 1, \ldots, K-1.$$

Figure 6A:
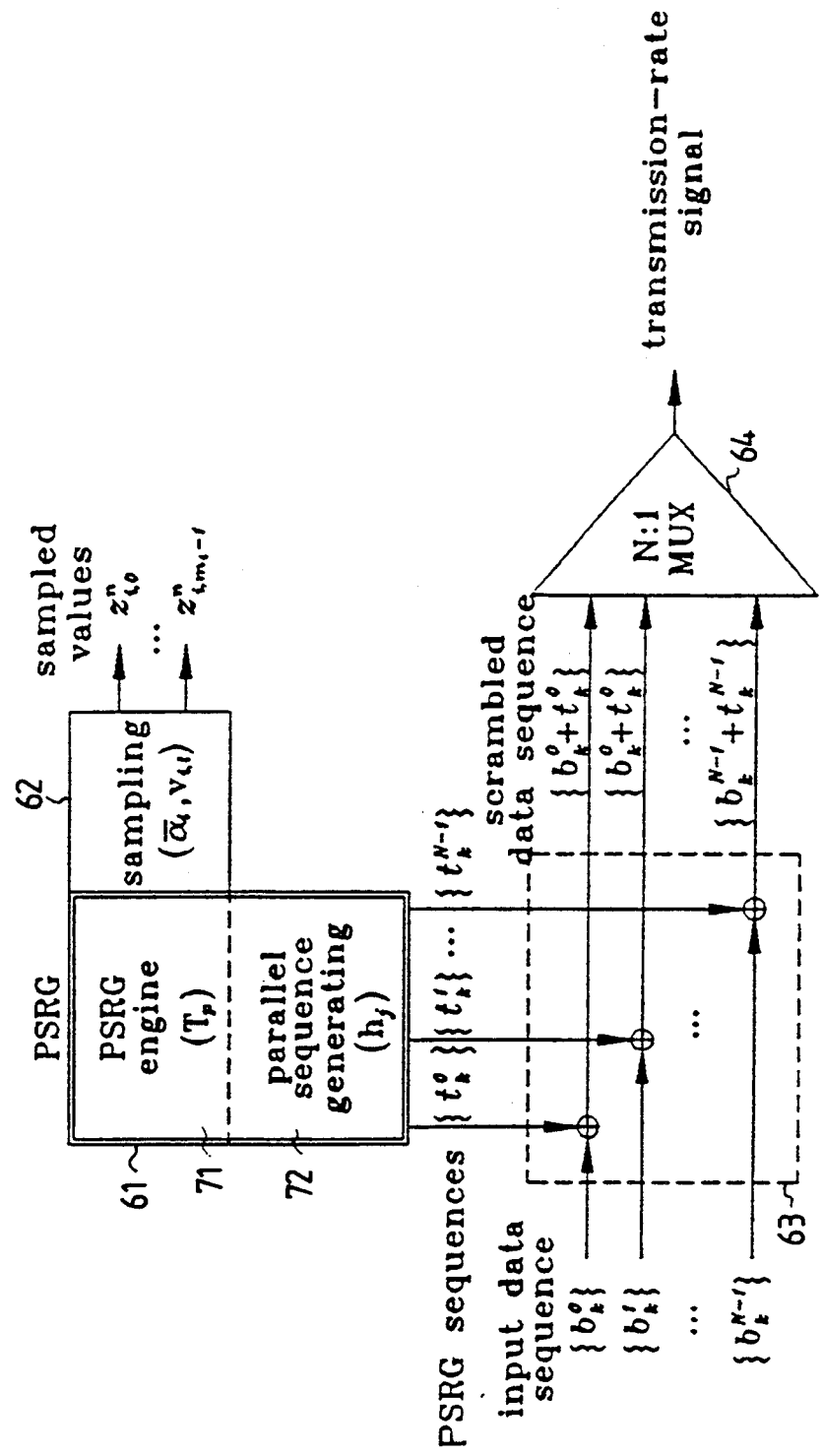
FIG. 6A is a functional block diagram of a parallel scrambler of a parallel DSS system.
Figure 6B:
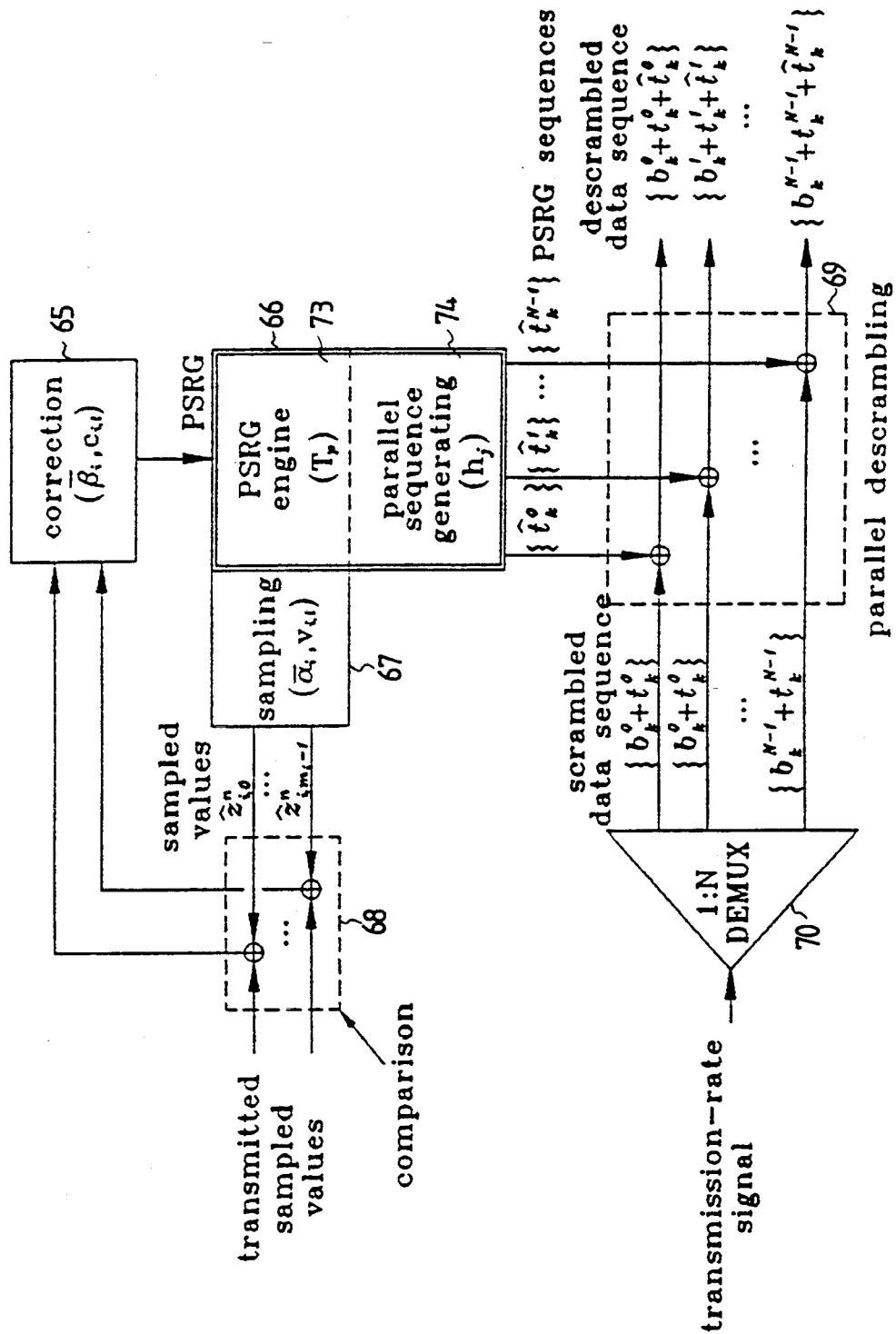
FIG. 6B is a functional block diagram of a parallel descrambler of a parallel DSS system.

If we reflect all the modifications required for parallel realization of DSS system in FIG. 2, we obtain the modified block diagram in FIG. 6. FIG. 6A shows the parallel scrambler of parallel DSS system and FIG. 6B shows the parallel descrambler. In FIG. 6 the 1:N demultiplexer for the scrambler and the N:1 multiplexer for the descrambler are omitted. As shown in FIG. 6A, the parallel scrambler comprises a parallel shift register generator (PSRG) 61 comprising a plurality of shift registers and a plurality of modulo-2 adders, a sampling circuit 62, a parallel scrambling circuit 63 and a N:1 multiplexer 64. The PSRG 61 includes a shift register generator engine 71 for generating a state transition matrix for shift registers and a parallel sequence-generating circuit 72 for generating parallel sequences for scrambling parallel input data sequences. The sampling circuit 62 generates samples from the parallel shift register generator 61 depending on transmission channel slots available for sample conveyance. The parallel scrambling circuit 63 performs a parallel scrambling function by adding the parallel sequences from the parallel shift register generator 61 to the input data sequences. The N:1 multiplexer (MUX) 64 multiplexes the scrambled data sequences from the parallel scrambling circuit 63. Also as shown in FIG. 6B, the parallel descrambler comprises a demultiplexer(DEMUX) 70, a parallel shift register generator 66, a sampling circuit 67, a comparing circuit 68, a correction circuit 65 and a parallel descrambling circuit 69. The parallel shift register generator (PSRG) 66 comprises a plurality of shift registers and a plurality of modulo-2 adders, and includes a shift register generator engine 73 for generating a state transition matrix for shift registers and a parallel sequence-generating circuit 74 for generating parallel sequences for descrambling of the scrambled data sequences. The DEMUX 70 demultiplexes the multiplexed scrambled data sequences. The sampling circuit 67 generates samples from the parallel shift register generator depending on transmission channel slots available for sample conveyance. The comparing circuit 68 is connected to the sampling circuit 67 and compares the samples transmitted from the scrambler with the samples generated by the sampling circuit 67.

The correction circuit 65 is connected to the comparing circuit 68 and performs correction for samples at each correction time according to the comparison result from the comparing circuit 68. The output of the correction circuit 65 is applied to the PSRG 66. The parallel descrambling circuit 69 performs the parallel descrambling of the scrambled data sequences by adding the parallel sequences from the PSRG 66 to the scrambled data sequences from the DEMUX 70.

To implement the PDSS system shown in FIG. 6, we first should obtain the state transition matrix Tp and the parallel sequence generating vector $h_j$, $j=0, 1, \ldots N-1$ of PSRG, the sampling time slot $\bar{\alpha}_4$, $i=0, 1, \ldots K-1$ and the sampling vector $v_{i,l}$, $i=0, 1, \ldots, K-1$, $l=0,1, \ldots m_i-1$ of the sampling circuit, and the correction time slot $\bar{\beta}_i$, and the correction vector $i=0.1 \ldots K-1$, $l=0, 1, \ldots, m_i-1$ of the correction circuit.

The state transition matrix Tp and the parallel sequence generating vector $h_j$ can be obtained from the paper by D. W. Choi, entitled "Parallel scrambling techniques for digital multiplexer" AT&T Tech. J, pp. 123-136, Sept./Oct. 1986. Also, the sampling time slot $\overline{\alpha_i}$ and the sampling vector $v_{i,l}$ are determined by the relation between the serial data sequence in FIG. 1 and the parallel data sequence in FIG. 4. Therefore, it is important to obtain the correction time slot $\overline{\beta_i}$ and the correction vector $c_{i,l}$.

To obtain the correction time slot $\beta_i$ and the correction vector $c_{i,l}$, we denote by $\delta_k$, the state distance vector representing difference between the state vector from the scrambler and the state vector from the descrambler, or more specifically, $$\delta_k = d_k + \hat{d}_k. \qquad (9)$$

Then, the synchronization of PDSS is solely determined by the nullness of $\delta_k$.

Noting that expression for $d_k$ in equation (5) changes to equation (8) only when correction occurs and that correction occurs at times $nF + \overline{\beta_i}$, we can modify equations (5) and (8) in the forms, respectively $$d_{n\hat{F}+\overline{\beta_i}} = \begin{cases} T_p^{\overline{\beta_0}+\hat{F}-\overline{\beta K-1}} \cdot d_{(n-1)\hat{F}+\overline{\beta K-1}}, & i = 0 \\ T_p^{\overline{\beta_i}-\overline{\beta_{i-1}}} \cdot d_{n\hat{F}+\overline{\beta_{i-1}}}, & i = 1, 2, \ldots, K-1, \end{cases} \qquad (10)$$

$$\hat{d}_{n\hat{F}+\overline{\beta_i}} = \begin{cases} T_p^{\overline{\beta_0}+\hat{F}-\overline{\beta K-1}} \cdot d_{(n-1)\hat{F}+\overline{\beta K-1}} + \sum_{l=0}^{m_0-1}(z_{0,l}^n + \hat{z}_{0,l}^n) c_{0,l}, & i = 0, \\ T_p^{\overline{\beta_i}-\overline{\beta_{i-1}}} \cdot \hat{d}_{n\hat{F}+\overline{\beta_{i-1}}} + \sum_{l=0}^{m_0-1}(z_{i,l}^n + \hat{z}_{i,l}^n) c_{i,l}, & i = 1, 2, \ldots, K-1, \end{cases} \qquad (11)$$

Combining these two equations along with equation (7) and the relation $$\delta_{nF+\overline{\alpha_i}} = T_p^{\overline{\alpha_i}-\overline{\beta_{i-1}}} \cdot \delta_{nF+\overline{\beta_{i-1}}},$$

, we get $$\delta_{nF+\overline{\beta_i}} = \begin{cases} \left( T_p^{\overline{\beta_0}+\hat{F}-\overline{\beta K-1}} + \sum_{l=0}^{m_0-1} c_{0,l} \cdot v_{0,l}^t \cdot T_p^{\overline{\alpha_0}+\hat{F}-\overline{\beta K-1}} \right) \cdot \delta_{(n-1)\hat{F}+\overline{\beta K-1}}, & i = 0, \\ \left( T_p^{\overline{\beta_i}-\overline{\beta_{i-1}}} + \sum_{l=0}^{m_i-1} c_{i,l} \cdot v_{i,l}^t \cdot T_p^{\overline{\alpha_i}-\overline{\beta_{i-1}}} \right) \cdot \delta_{n\hat{F}+\overline{\beta_{i-1}}}, & i = 1, 2, \ldots, K-1. \end{cases} \qquad (12)$$

that is $$\delta_{n\hat{F}+\overline{\beta k-1}} = \Lambda^* \cdot \delta_{(n-1)\hat{F}+\overline{\beta k-1}} \qquad (13)$$

where $\Lambda^*$ is a correction matrix which has the expression $$\Lambda^* = \qquad (14)$$

$$\left( T_p^{\overline{\beta K-1}-\overline{\beta K-2}} + \sum_{l=0}^{m_{K-1}-1} c_{K-1,l} \cdot v_{K-1,l}^t \cdot T_p^{\overline{\alpha K-1}-\overline{\beta K-2}} \right).$$

$$\left( T_p^{\overline{\beta K-2}-\overline{\beta K-3}} + \sum_{l=0}^{m_{K-2}-1} c_{K-2,l} \cdot v_{K-2,l}^t \cdot T_p^{\overline{\alpha K-2}-\overline{\beta K-3}} \right) \ldots$$

$$\left( T_p^{\overline{\beta_1}-\overline{\beta_0}} + \sum_{l=0}^{m_1-1} c_{1,l} \cdot v_{1,l}^t \cdot T_p^{\overline{\alpha_1}-\overline{\beta_0}} \right).$$

$$\left( T_p^{\overline{\beta_0}+\hat{F}-\overline{\beta K-1}} + \sum_{l=0}^{m_0-1} c_{0,l} \cdot v_{0,l}^t \cdot T_p^{\overline{\alpha_0}+\hat{F}-\overline{\beta K-1}} \right).$$

Therefore, after correction in nth packet is complete, the relation between the finally corrected state distance vector $\delta_{n\hat{F}+\overline{\beta k-1}}$ and the initial state distance vector $\delta_0$ turns out to be $$\delta_{n\hat{F}+\overline{\beta k-1}} = \Lambda^{*n} \cdot T_p^{-\hat{F}+\overline{\beta k-1}} \cdot \delta_0 \qquad (15)$$

In order to achieve the synchronization of the scrambler and the descrambler, it is necessary to make the finally corrected state distance vector $\delta_{n\hat{F}+\overline{\beta k-1}}$ a zero vector regardless of the initial state distance vector $\delta_o$, which can be done only making the correction matrix $\Lambda^n$ a zero matrix. In the case that the length of the SRG in PSRG in L, in order to predict the state of the L shift registers, the number the samples more than L should be transmitted to the descrambler. Since J samples per one packet are transmitted, the number of samples transmitted for n packets is nJ. Therefore, assuming that W is a smallest integer such that WJ is larger than L, at least W packets after, the synchronization of the descrambler can be achieved. Therefore, the synchronization problem can be restated as a problem of identifying appropriate the correction time slot $\overline{\beta_i}$ and the correction vector $c_{i,l}$ for the sampling time slot $\overline{\alpha_i}$ and the sampling vector $v_{i,l}$ given above to make the matrix $\Lambda_k^w$ a zero matrix.

Only in the case that the sampling time slot $\overline{\alpha_i}$ and the sampling vector $v_{i,l}$ related with the sampling process suffice the conditions described in the following theorem, the synchronization can be achieved W packets after (In fact, in case of the serial DSS system, if the synchronization is achieved at Wth packets later, $\overline{\alpha_i}$ and $v_{i,l}$ automatically suffice the condition described in the theorem 1.).

Theorem 1 (Sampling Condition); We define the discrimination matrix as the following matrix.

$$\Delta = \begin{vmatrix} v^t_{0,0} \cdot \overline{T_p^{a0}} \\ \cdots \\ v^t_{0,m_0-1} \cdot \overline{T_p^{a0}} \\ \cdots \\ \cdots \\ v^t_{K-1,0} \cdot \overline{T_p^{aK-1}} \\ \cdots \\ v^t_{K-1,mK-1-1} \cdot \overline{T_p^{aK-1}} \\ \cdots \\ \overline{v^t_{0,0} \cdot T_p^{(W-1)} \hat{F} + \overline{a_0}} \\ \cdots \\ v^t_{0,m_0-1} \cdot \overline{T_p^{(W-1)\hat{F}+\overline{a_0}}} \\ \cdots \\ v^t_{K-1,0} \cdot \overline{T_p^{(W-1)\hat{F}+\overline{aK-1}}} \\ \cdots \\ v^t_{K-1,mK-1-1} \cdot \overline{T_p^{(W-1)\hat{F}+\overline{aK-1}}} \end{vmatrix} \quad (16)$$

Then only in the case that the rank of the discrimination matrix $\Delta$ (namely, WJ×L matrix) equals to the length L of the SRG, there can be exist $\overline{\beta}$; and $c_{i,l}$ making the correction matrix $\Lambda^{*w}$ a zero matrix.

Now, assuming that the sampling time slot $\overline{\alpha_i}$ and the sampling vector $v_{i,l}$ suffice the theorem 1, the following theorem 2 describes how to choose the correction time slot $\overline{\beta_i}$ and the correction vector $c_{i,l}$ regarding to the correction process to achieve synchronization after W packets.

Theorem 2 (Correction Condition); In the case that the discrimination matrix is rank of L, we can make an L×L nonsingular matrix $\overline{\Delta}$ by excluding some rows among the first J rows of the discrimination matrix $\Delta$. Then, the matrix $\Lambda^{*W}$ becomes a zero matrix, if we choose the correction vectors as follows:

$$c_{i,l} = \quad (17)$$

$$\begin{cases} T_p^{(W-1)F+\overline{\beta_i}} \cdot \overline{\Delta}^{-1} \cdot e_{Iu} + \sum_{j=I_{i,j}}^{L-1} u_{i,l,j} e_l, i = 0, 1, \ldots, K-2, \\ T_p^{(W-1)F+\overline{\beta K-1}} \cdot \overline{\Delta}^{-1} \cdot e_{IK-1,a} \quad i = K-1, \end{cases}$$

for arbitrary correction time slots $\overline{\beta_i}$, where, $e_i$, $i=0, 1, \ldots, L-1$, is the unit vector whose ith element is 1 and the others are 0, $I_{i,l}$ is the index of the row in the matrix $\overline{\Delta}$, and $u_{i,l,j}$ is any one of 1 or 0.

Figure 8A:
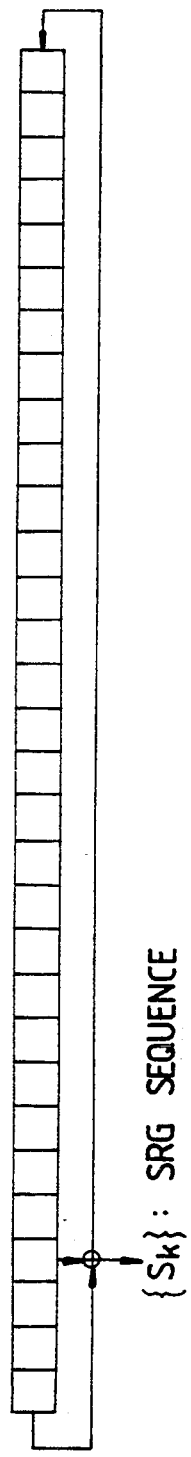
FIG. 8A shows a serial shift register generator for CCITT-DSS.

We finally apply the results derived above to achieve parallel realizations of the DSS adopted by CCITT. According to the CCITT document on ATM cell scrambling, the DSS (here-in-after, referred to CCITT-DSS) employs the SRG as shown in FIG. 8A for scrambling the serial input data sequence which consists of ATM cell stream of 53 bytes (424 bits: F=424) as shown in FIG. 7. As shown in FIG. 7, 2 (J=2) samples $s_{t.2ii}$ and s per one ATM cell are taken from the scrambler and transmitted over two contiguous sampling time slots $\alpha_=32$ and $\alpha_1=33$ to the descrambler. The transmission rate of ATM cell is 155.520 Mbps, 622.080 Mbps, or 2488.320 Mbps.

For the parallel realization of CCITT-DSS(or CCITT-PDSS, in short), we first decide N, the number of parallelism. Among the submultiples of 424, we choose 8 of N, since it also matches the byte-level parallel processing. Then, $\hat{F}$ becomes 53 (=F/N) and the scrambling rate is 19.44 Mbps (=155.520/8), 77.76 Mbps (=622.080/8), or 311.04 Mbps (2488.320/8).

Figure 8B:
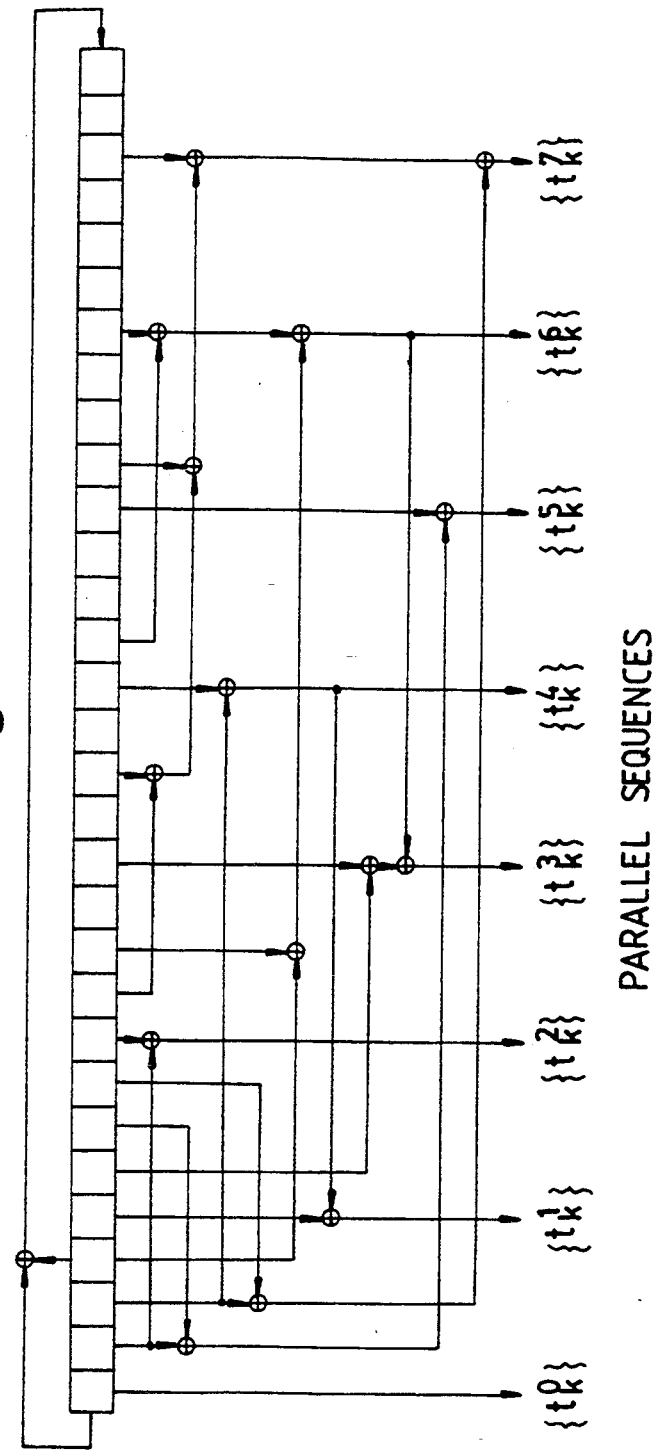
FIG. 8B shows a parallel shift register generator for CCITT-DSS.

Now referring to FIG. 8, FIG. 8A shows the serial SRG and FIG. 8B shows the parallel SRG. The parallel SRG generates eight parallel sequences $\{t_k{}^j\}$, $j=0, 1, \ldots, 7$. In this case, the length L of PSRG is 31, and the state transition matix Tp and the generating vector $h_j$, $j=0, 1, \ldots, 7$, are respectively.

$$T_p = [t_{i,j}]_{31 \times 31}, \, t_{i,j} = \begin{cases} 1, j = i+1, i = 0, 1, \ldots, 29 \\ 1, (i,j) = (30, 0) \text{ or } (30, 3), \\ 0, \text{otherwise,} \end{cases} \quad (18)$$

$$h_0 = [1\,0\,0\,0\,0\,0\,0\,0\,0\,0\,0\,0\,0\,0\,0\,0\,0\,0\,0\,0\,0\,0\,0\,0\,0\,0\,0\,0\,0\,0\,0]^t, \quad (19a)$$

$$h_1 = [0\,0\,1\,0\,1\,0\,0\,0\,0\,0\,0\,0\,0\,0\,0\,0\,0\,0\,0\,1\,0\,0\,0\,0\,0\,0\,0\,0\,0\,0\,0]^t, \quad (19b)$$

$$h_2 = [0\,1\,0\,0\,0\,0\,0\,1\,0\,0\,0\,0\,0\,0\,0\,0\,0\,0\,0\,0\,0\,0\,0\,0\,0\,0\,0\,0\,0\,0\,0]^t, \quad (19c)$$

$$h_3 = [0\,0\,0\,1\,0\,1\,0\,0\,0\,0\,1\,0\,1\,0\,0\,0\,0\,1\,0\,0\,0\,0\,0\,1\,0\,0\,0\,0\,0\,0\,0]^t, \quad (19d)$$

$$h_4 = [0\,0\,1\,0\,0\,0\,0\,0\,0\,0\,0\,0\,0\,0\,0\,1\,0\,0\,0\,0\,0\,0\,0\,0\,0\,0\,0\,0\,0\,0\,0]^t, \quad (19e)$$

$$h_5 = [0\,1\,0\,0\,0\,0\,1\,0\,0\,0\,0\,0\,0\,0\,0\,0\,0\,0\,1\,0\,0\,0\,0\,0\,0\,0\,0\,0\,0\,0\,0]^t, \quad (19f)$$

$$h_6 = [0\,0\,0\,1\,0\,0\,0\,0\,0\,0\,1\,0\,0\,0\,0\,0\,1\,0\,0\,0\,0\,0\,0\,1\,0\,0\,0\,0\,0\,0\,0]^t, \quad (19g)$$

$$h_7 = [0\,0\,1\,0\,0\,0\,0\,1\,0\,1\,0\,0\,0\,0\,1\,0\,0\,0\,0\,0\,0\,1\,0\,0\,0\,0\,0\,1\,0\,0]^t. \quad (19h)$$

Next, to implement the sampling circuit, the sampling time slot $\overline{\alpha_i}$ and the sampling vector $v_{i,l}$ should be obtained. Noting that the multiplexed sequence of eight parallel sequences $\{t_k{}^j\}$, $j=0, 1, \ldots, 7$ must be identical to the serial SRG sequence $\{s_k\}$, we can find that the samples $s_{t-211}$ and $s_t$ of the scrambler SRG in the serial CCITT-DSS correspond respectively to the samples $t_{t-27}{}^{56}$ and $t^7$ of the scrambler PSRG in the parallel DSS, and are transmitted over the same time slots in the 0th and 1th parallel data sequences (K=1, m=2). In this case, the parallel sampling time slot $\overline{\alpha_0}$ becomes 4, and the sampling vectors $v_{0,0}$, and $v_{0,1}$ are as follows.

$$v_{0,0} = (T^{-27})^t \cdot h_5 \quad (20a)$$
$$= [1\,1\,1\,0\,0\,1\,0\,0\,1\,0\,1\,1\,0\,1\,1\,0\,1\,1\,0\,1\,1\,0\,1\,1\,1\,1\,1\,1\,1\,1\,1]^t,$$

$$v_{1,1} = h_1 \quad (20b)$$
$$= [0\,0\,1\,0\,1\,0\,0\,0\,0\,0\,0\,0\,0\,0\,0\,0\,0\,0\,0\,1\,0\,0\,0\,0\,0\,0\,0\,0\,0\,0\,0]^t.$$

Finally, to implement the correction circuit, we consider the correction time slot $\overline{\beta}$; and the correction vector $c_{i,l}$. In this case, since L=32 and J=2, we have W=16. Applying these numbers along with the expressions (20a) and (20b) to the expression (16), we can find that the discrimination matrix (32×31 matrix) is of rank 31. Also, by excluding 0th row from the discrimination matrix $\Delta$, 31×31 nonsingular matrix $\overline{\Delta}$ can be obtained. Applying this nonsingular matrix along with the correction time slot $\overline{\beta_0}=5$ (This means that correction occurs immediately after the samples are taken.) to the expression (17), we can obtain the following correction vectors.

$$\begin{cases} c_{0,0} = [0\ 1\ 1\ 0\ 1\ 1\ 1\ 0\ 0\ 0\ 1\ 1\ 1\ 0\ 0\ 1\ 0\ 1\ 1\ 1\ 0\ 1\ 1\ 0\ 1\ 1\ 1\ 0\ 0\ 1\ 1]^t, \\ c_{0,1} = [1\ 0\ 1\ 0\ 1\ 0\ 0\ 1\ 0\ 0\ 1\ 0\ 0\ 0\ 1\ 1\ 1\ 0\ 1\ 1\ 1\ 1\ 1\ 1\ 0\ 0\ 0\ 1\ 1\ 0\ 0]^t. \end{cases} \quad (21)$$

Figure 9:
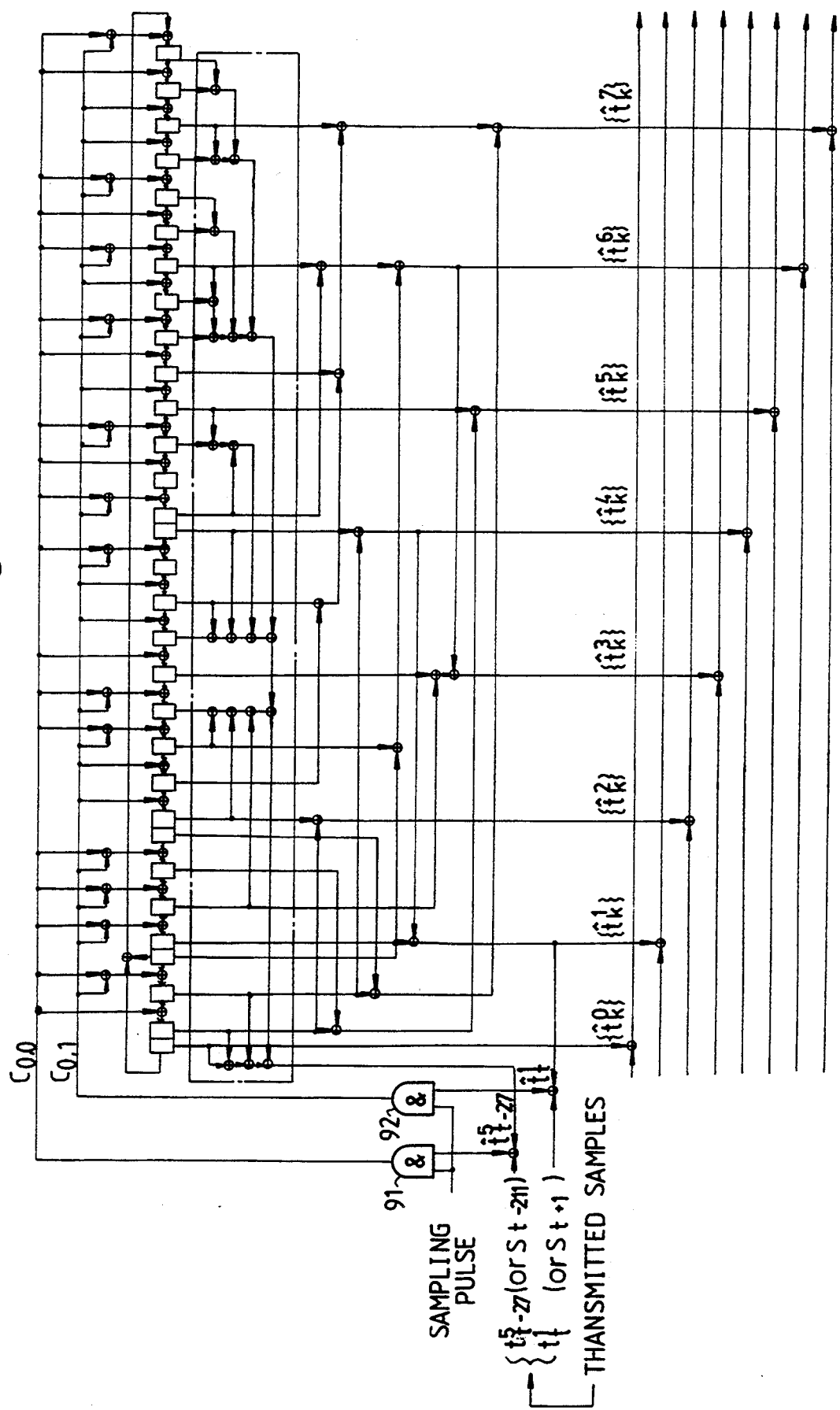
FIG. 9 shows an embodiment of a parallel descrambler for ATM cell scrambling.

By using the sampling vectors in expressions (20a) and (20b), the correction vectors in expression (21), the sampling time slot $\overline{\alpha_0}=4$ and the correction time slot $\overline{\beta_0}=5$, we can implement the parallel descrambler for CCITT-PDSS as shown in FIG. 9. In FIG. 9, the tetragons denote shift registers, the $\oplus$ marks denote modulo-2 adders and reference numerals 91 and 92 denote AND gates which form a part of the correction circuit 65. The dotted box is a realization of the circuit of sampling vector $v_{0,0}$ which generates the descrambler PSRG state samples $t_{t-2n}{}^5$. The constitution of the scrambler for CCITT-PDSS is identical to that of the descrambler as shown in FIG. 9 except for the correction circuit and the comparing circuit.

We claim:

1. A parallel distributed sample scrambling system for fixed-sized packet transmission comprising;
    a parallel shift register generator for generating parallel sequences for parallel scrambling, said generator including a plurality of shift registers and a plurality of modulo-2 adders,
    a sampling means for generating samples of said parallel sequences from said parallel shift register generator depending on transmission channel slots available for sample conveyance,
    a parallel scrambling means for performing parallel scrambling function by modulo-2 adding the parallel sequences from said parallel shift register generator to parallel input data sequences, and
    a multiplexing means for multiplexing the scrambled data sequences from said parallel scrambling means.

2. A parallel distributed sample scrambling system according to claim 1, wherein said parallel shift register generator comprises;
    a shift register generator engine for generating a state transition matrix for shift registers, and
    a parallel sequence-generating means for generating parallel sequences for scrambling of the input data sequences.

3. A parallel distributed sample scrambling system according to claim 2, wherein said parallel scrambling means comprises a plurality of modulo-2 adders.

4. A parallel distributed sample descrambling system for fixed-sized packet transmission comprising:
    a demultiplexing means for demultiplexing the multiplexed scrambled data sequences,
    a parallel shift register generator for generating parallel sequences for parallel descrambling, said generator including a plurality of shift registers and a plurality of modulo-2 adders,
    a sampling means for generating samples of said parallel sequences from said parallel shift register generator depending on transmission channel slots available for sample conveyance,
    a comparing means, connected to the sampling means, for comparing the samples transmitted from the scrambler with the samples generated by said sampling means,
    a correction means, connected to the comparing means, for performing correction for samples at each correction time according to the comparison result for said comparing means, and
    a parallel descrambling means for performing parallel descrambling of the scrambled data sequences by modulo-2 adding the parallel sequences from said parallel shift register generator to the scrambled data sequences from said demultiplexing means.

5. A parallel distributed sample descrambling system according to claim 4, wherein said parallel shift register generator comprises;
    a shift register generator engine for generating a state transition matrix of shift registers, and
    a parallel sequence-generating means for generating parallel sequences for descrambling of the scrambled data sequences.

6. A parallel distributed sample descrambling system according to claim 5, wherein said comparing means comprises a plurality of modulo-2 adders.

7. A parallel distributed sample descrambling system according to claim 6, wherein said correction means comprises a plurality of AND gates each of which has one input to which a sampling pulse is applied and one input connected to the output of one of said modulo-2 adders.

8. A parallel distributed sample descrambling system according to claim 7, wherein said parallel descrambling means comprises a plurality of modulo-2 adders.

* * * * *